(12) United States Patent
Chang et al.

(10) Patent No.: US 9,547,401 B2
(45) Date of Patent: Jan. 17, 2017

(54) TOUCH PANEL

(71) Applicant: TPK Touch Systems (Xiamen) Inc., Xiamen (CN)

(72) Inventors: Chen-Hsin Chang, Taoyuan (TW); Bin Zhong, Xiamen (CN); Che-I Wu, Hsinchu (TW); Fuding Wang, Xiamen (CN); Lixian Chen, Xiamen (CN); Yongbin Ke, Xiamen (CN)

( * ) Notice: Subject to any disclaimer, the term of this patent is extended or adjusted under 35 U.S.C. 154(b) by 61 days.

(21) Appl. No.: 14/617,951

(22) Filed: Feb. 10, 2015

(65) Prior Publication Data

US 2015/0286315 A1   Oct. 8, 2015

(30) Foreign Application Priority Data

Apr. 2, 2014 (CN) .......................... 2014 1 0139518

(51) Int. Cl.
*G06F 3/044* (2006.01)

(52) U.S. Cl.
CPC ..................................... *G06F 3/044* (2013.01)

(58) Field of Classification Search
CPC ...... G06F 3/041; G06K 9/00013; H05K 1/118
See application file for complete search history.

(56) References Cited

U.S. PATENT DOCUMENTS

| | | | |
|---|---|---|---|
| 8,803,004 B2* | 8/2014 | Guard ................. | H03K 17/962 174/259 |
| 2003/0052867 A1* | 3/2003 | Shigetaka ............... | G06F 3/044 345/173 |
| 2008/0143683 A1* | 6/2008 | Hotelling .............. | G06F 3/0416 345/173 |
| 2011/0304564 A1* | 12/2011 | Kim ........................ | G06F 3/044 345/173 |
| 2011/0304571 A1* | 12/2011 | Kim ..................... | G02F 1/13338 345/173 |
| 2013/0161081 A1* | 6/2013 | Song ....................... | G06F 3/041 174/261 |
| 2013/0194212 A1* | 8/2013 | Shin ........................ | G06F 3/041 345/173 |
| 2014/0253459 A1* | 9/2014 | Koo ...................... | G06F 3/0416 345/173 |

* cited by examiner

*Primary Examiner* — Kevin M Nguyen

(57) ABSTRACT

A touch panel includes a driving layer and a sensing layer. The driving layer has a first top surface and a driving layer edge. The first top surface has at least one first connecting region. The driving layer edge surrounds the first connecting region and there is a first distance between the first connecting region and the driving layer edge. The sensing layer is disposed on the first top surface of the driving layer. The second top surface of sensing layer away from the driving layer has at least one second connecting region. The sensing layer edge of the sensing layer surrounds the second connecting region, and there is a second distance between the sensing layer edge and the at least one second connecting region.

20 Claims, 6 Drawing Sheets

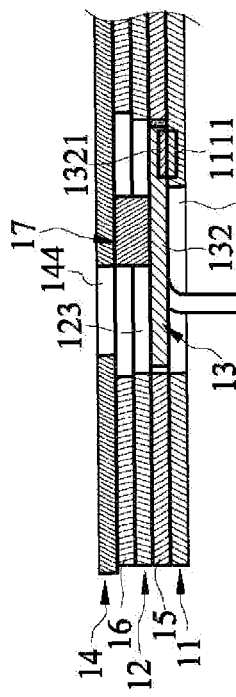
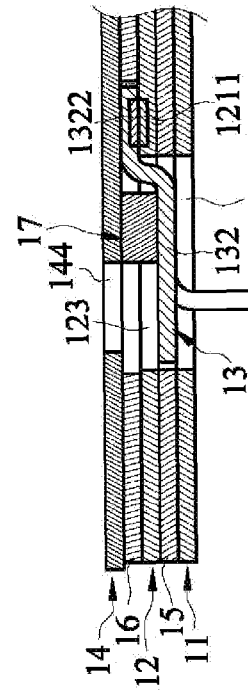
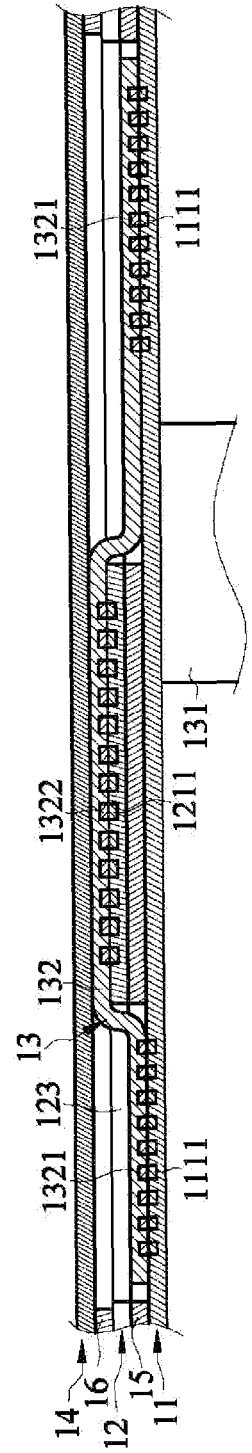
FIG.3
FIG.4
FIG.5

TOUCH PANEL

BACKGROUND OF THE INVENTION

This non-provisional application claims priority of Patent Application No. 201410139518.3 filed in China on Apr. 2, 2014, the entire contents of which are hereby incorporated by reference.

FIELD OF THE INVENTION

The disclosure relates to touch panels, and more particularly to touch panels with resistance to water, salt spray, and other environmental influences.

DESCRIPTION OF THE RELATED ART

In the past, users submitted commends to an electronic device by clicking a mouse or a keyboard to interconnect with the electronic device. However, with development of technology, electronic devices have became more compact, and manufacturers have begun to implement touch modules as an input module by which a user submits inputs to the electronic device. Therefore, the weight and the volume of the input module are decreased, and the electronic device becomes portable.

In general, the touch module includes a substrate, a sensing layer, an electric wire and an electrical contact. The sensing layer, the electric wire and the electrical contact are all located on the substrate. One end of the electric wire connects to the sensing layer while the other end of the electric wire connects to the electrical contact at an edge of the substrate. A flexible printed circuit board is connected to the electrical contact to transmit the signal from the sensing layer to a control circuit. After calculation by the circuit, the signal is transformed into coordinate data that the electronic device is able to read.

The electrical contact is generally located at the edge of the substrate. Moreover, since the flexible printed circuit board has a thickness, an air gap is formed between the edge of the substrate and a case of the touch module. As a result, the flexible printed circuit board, the electrical contact and the electric wire are easily corroded by salt spray and moisture in the air gap, resulting in functional failure of the touch module.

BRIEF SUMMARY OF THE DISCLOSURE

According to one aspect of the disclosure, a touch panel comprises a driving layer and a sensing layer is provided. The driving layer has a first top surface and a driving layer edge. The first top surface has at least one first connecting region. The driving layer edge surrounds the at least one first connecting region and there is a first distance between the driving layer edge and the at least one first connecting region. The sensing layer is disposed on the first top surface of the driving layer. A second top surface of the sensing layer away from the driving layer has at least one second connecting region. A sensing layer edge of the sensing layer surrounds the at least one second connecting region and there is a second distance between the sensing layer edge and the at least one second connecting region.

According to another aspect of the disclosure, a touch panel comprises a touching layer having a top surface and a touching layer edge is provided. The top surface has at least one first connecting region. The touching layer edge surrounds the at least one first connecting region and there is a third distance between the touching layer edge and the at least one first connecting region.

According to the disclosure, when the touch panel comprises double thin-film structures, there is a first distance between the driving layer edge and the first connecting region, and there is a second distance between the sensing layer edge and the second connecting region. When the touch panel comprises single thin-film structure, there is a third distance between the touching layer edge and the first connecting region. Therefore, it is favorable for preventing the touch panel from being easily corroded by salt spray and moisture.

BRIEF DESCRIPTION OF THE DRAWINGS

The present invention will become more fully understood from the detailed description given herein below and the accompanying drawings which are given by way of illustration only and thus are not limitative of the present invention and wherein:

FIG. 3 is a cross-sectional view of the touch panel along a line 3-3 in FIG. 1;

FIG. 4 is a cross-sectional view of the touch panel along a line 4-4 in FIG. 1;

FIG. 5 is a cross-sectional view of the touch panel along a line 5-5 in FIG. 1;

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The disclosure provides a touch panel configured to be disposed on an electronic device. When touched by a user or an external component, the touch panel calculates a relative position according to a touch position. The signal indicating the relative position is transmitted to the electronic device to be processed. In an embodiment, the touch panel is a thin-film capacitive touch panel, but the disclosure is not limited thereto.

Figure 1:
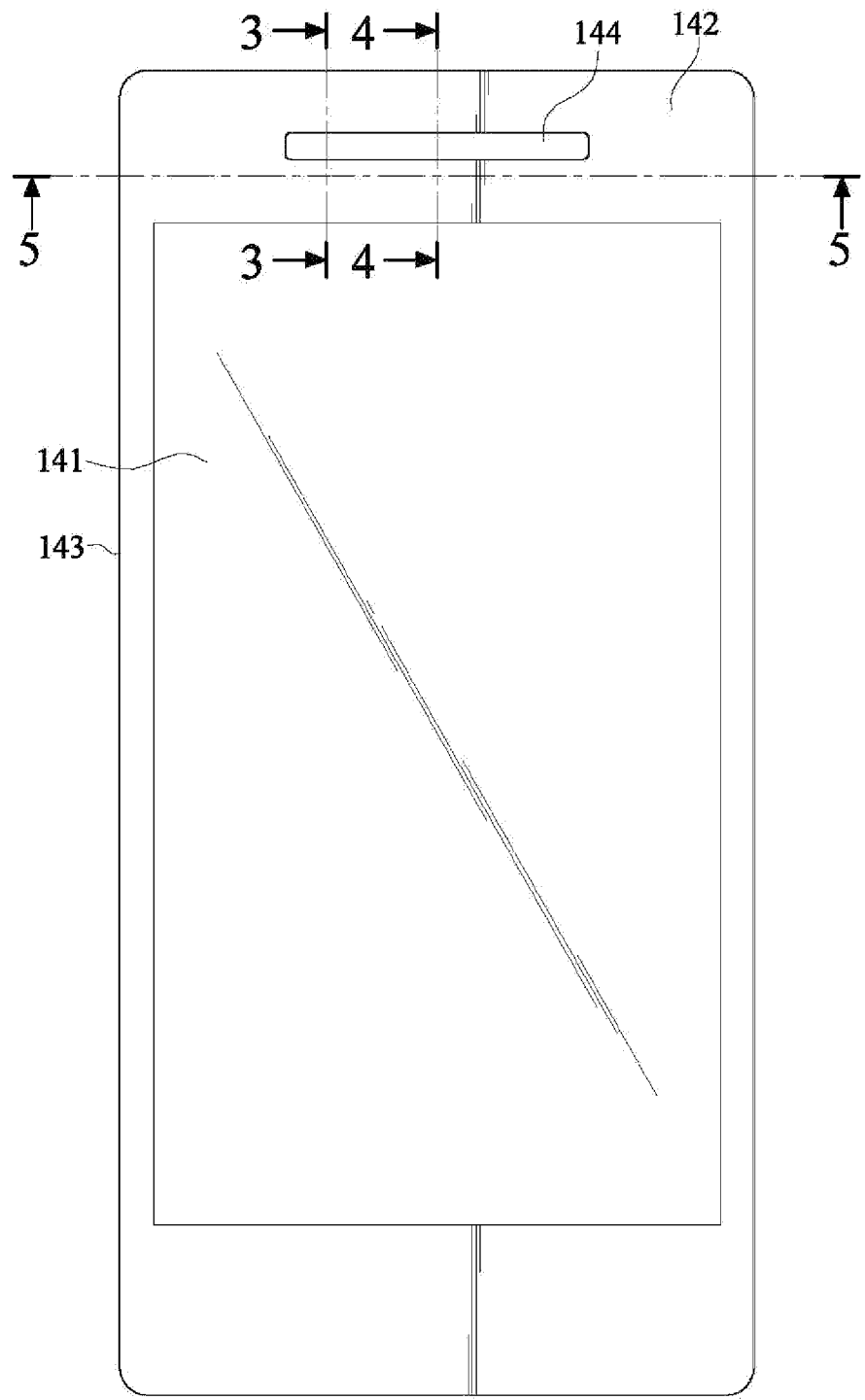
FIG. 1 is a front view of a touch panel according to an embodiment of the disclosure.
Figure 2:
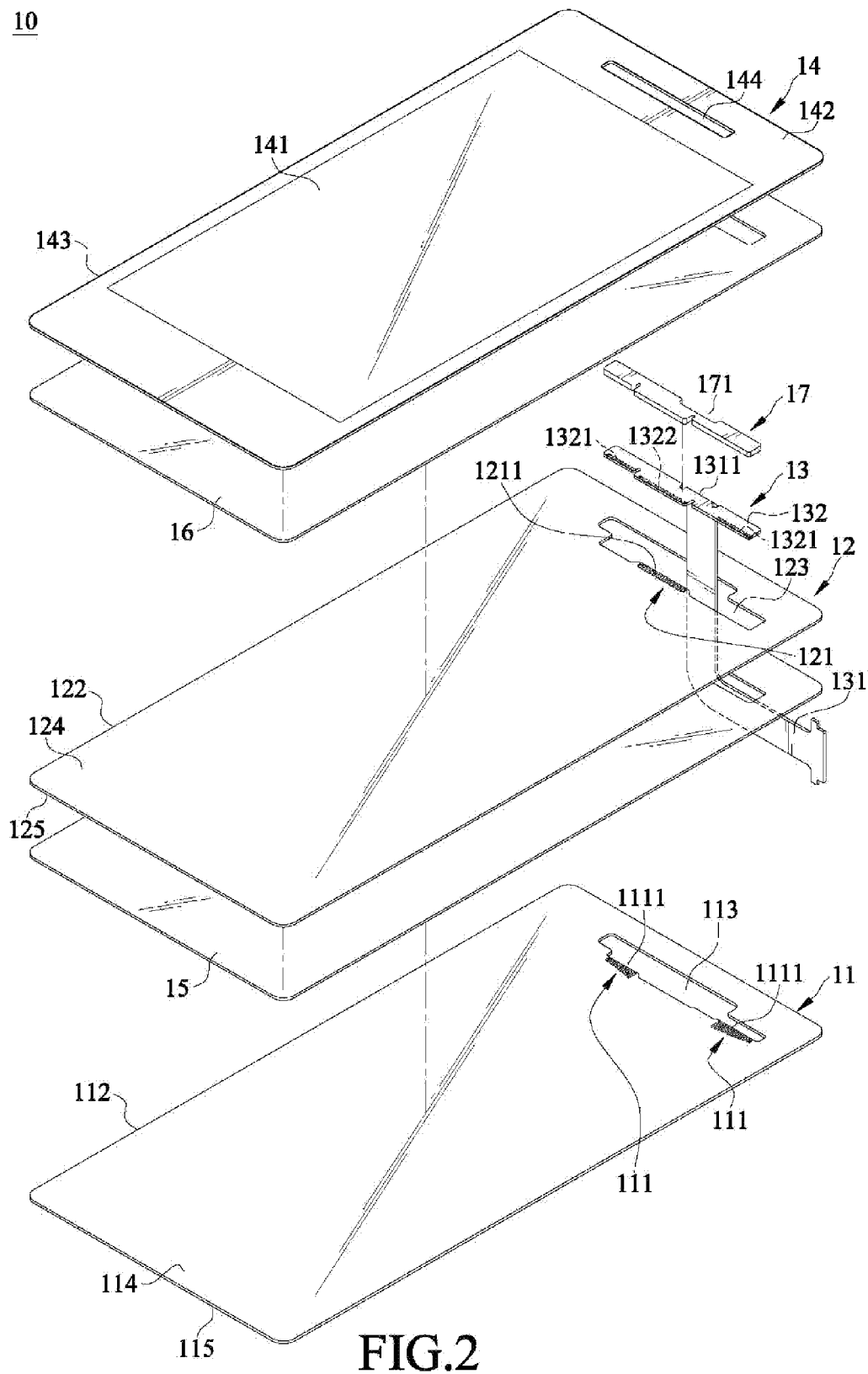
FIG. 2 is an exploded view of the touch panel in FIG. 1.

Please refer to FIG. 1 and FIG. 2. FIG. 1 is a front view of a touch panel according to various embodiments of the disclosure, and FIG. 2 is an exploded view of the touch panel in FIG. 1 in accordance with at least one embodiment. In some embodiments, a touch panel 10 has a driving layer 11 and a sensing layer 12. In some embodiments, both the driving layer 11 and the sensing layer 12 are thin-film structures, which generally called double thin-film structures.

The driving layer 11 has a first top surface 114 and a first bottom surface 115 that are opposite to each other. A driving layer edge 112 is between the first top surface 114 and the first bottom surface 115 so that opposite two sides of the driving layer edge 112 are connected to the first top surface 114 and the first bottom surface 115, respectively. The first top surface 114 has two first connecting regions 111. The driving layer edge 112 surrounds the two first connecting regions 111 and there is a first distance between the driving layer edge 112 and the at least one first connecting region 111. In some embodiments, the first distance is in a range from about 0.2 mm to about 1 mm, but the disclosure is not limited thereto.

The sensing layer 12 is disposed and stacked on the first top surface 114 of the driving layer 11. One of the surfaces of the sensing layer 12 facing away from the driving layer 11 has a second connecting region 121. Specifically, the sensing layer 12 has a second top surface 124 and a second bottom surface 125 opposite to each other. A sensing layer edge 122 is between the second top surface 124 and the second bottom surface 125 so that opposite two sides of the sensing layer edge 122 are connected to the second top surface 124 and the second bottom surface 125, respectively. The second top surface 124 has the second connecting region 121. The sensing layer edge 122 surrounds the second connecting region 121, and there is a second distance between the sensing layer edge 122 and the second connecting region 121. In some embodiments, the second distance is in a range from about 0.2 mm to about 1 mm, but the disclosure is not limited thereto.

Furthermore, each of the driving layer 11 and the sensing layer 12 comprises a pattern layer, such as an X-axis electrode and a Y-axis electrode, respectively (not shown in the drawings). In some embodiments, the driving layer 11 and the sensing layer 12 are made of indium tin oxide (ITO), indium zinc oxide (IZO), cadmium tin oxide (CTO), aluminum zinc oxide (AZO), indium tin zinc oxide (ITZO), zinc oxide, cadmium oxide, hafnium oxide (HfO), indium gallium zinc oxide (InGaZnO), indium gallium zinc magnesium oxide (InGaZnMgO), indium gallium magnesium oxide (InGaMgO), indium gallium aluminum oxide (InGaAlO), graphene, silver nanowires, carbon nanotubes (CNT) or metal mesh, but the disclosure is not limited thereto.

In some embodiments, the pattern layers are located on the first top surface 114 and the second top surface 124, respectively. In some embodiments, the pattern layers are located on the first top surface 114 and the second bottom surface 125, the first bottom surface 115 and the second top surface 124, or the first bottom surface 115 and the second bottom surface 125, respectively. Moreover, the position of the first connecting regions 111 and the position of the second connecting region 121 are varied based on a disposition of the pattern layers. The disclosure is not limited to the dispositions and amount of the pattern layers, the first connecting regions 111 and the second connecting region 121 described herein and shown in the Figures. In other embodiments, both the number of first connecting regions 111 and the number of second connecting regions 121 is one or more than one.

Please refer to FIG. 2, FIG. 3 and FIG. 4. FIG. 3 is a cross-sectional view of the touch panel along a line 3-3 in FIG. 1. FIG. 4 is a cross-sectional view of the touch panel along a line 4-4 in FIG. 1. In some embodiments, the driving layer 11 has a driving layer hole 113 adjacent to the first connecting region 111, and the driving layer edge 112 also surrounds the driving layer hole 113. The sensing layer 12 has a sensing layer hole 123 being adjacent to the second connecting region 121, and the sensing layer edge 122 also surrounds the sensing layer hole 123. In some embodiments and some other embodiments, the first connecting region 111 has a driving layer electrical contact 1111, and the second connecting region 121 has a sensing layer electrical contact 1211. Both of the driving layer electrical contact 1111 and the sensing layer electrical contact 1211 are configured to be connected to a flexible printed circuit board for transmitting signals.

Further components of the touch panel 10 are now described. Please refer to FIGS. 2, 3, 4 and 5. FIG. 5 is a cross-sectional view of the touch panel along a line 5-5 in FIG. 1. The touch panel 10 further comprises a flexible printed circuit board 13, a cover plate 14, an optical adhesive layer 15, an optical adhesive layer 16 and an adhesive layer 17. The cover plate 14 is attached to the sensing layer 12 by the optical adhesive layer 16, and the sensing layer 12 is stacked on the first top surface 114 of the driving layer 11 and attached thereto by the optical adhesive layer 15. The optical adhesive layer 15 is between the driving layer 11 and the sensing layer 12, and the optical adhesive layer 16 is between the sensing layer 12 and the cover plate 14. The shape of the optical adhesive layer 15 corresponds to that of the sensing layer 12, and the shape of the optical adhesive layer 16 corresponds to that of the cover plate 14. After the sensing layer 12 is stacked on the driving layer 11, the sensing layer hole 123 at least partially overlaps the driving layer hole 113, and the two first connecting regions 111 are exposed by the sensing layer hole 123. The second connecting region 121 does not overlap the two first connecting regions 111. Furthermore, in some embodiments, the second connecting region 121 is between the two first connecting regions 111 and they do not overlap each other.

The following describes the structure of the cover plate 14. In some embodiments, the cover plate 14 is made of plastic material such as polycarbonate (PC) and [Acrylonitrile-Butadiene-Styrene] polymers (ABS), but the disclosure is not limited thereto. The cover plate 14 has a light transmissive region 141, a decoration region 142, a cover plate edge 143 and a cover hole 144. Both the light transmissive region 141 and the decoration region 142 are located on one of the surfaces of the cover plate 14 facing outward. The decoration region 142 surrounds the light transmissive region 141. A light beam may penetrate through the light transmissive region 141 whereby an electric component being beneath the light transmissive region 141 (not shown in the drawings), a display module for example, is shown. The decoration region 142 is opaque for blocking the electric components being beneath the decoration region 142. Both the first connecting region 111 and the second connecting region 121 are beneath the decoration region 142 so that both of them are covered by the decoration region 142. The cover plate edge 143 surrounds the cover hole 144 and is offset from the cover hole 144 by a distance. The cover hole 144 at least partially overlaps the driving layer hole 113 and the sensing layer hole 123. Therefore, the cover hole 144, the driving layer hole 113 and the sensing layer hole 123 all overlap each other to form an accommodation space. As seen in FIG. 1, in some embodiments, the cover hole 144 exposes a speaker, a light module, a radio module or a port located in the accommodation space (not shown in the drawings). In some embodiments, the driving layer 11, the sensing layer 12 and the cover plate 14 all have substantially the same shape. Moreover, the driving layer edge 112, the sensing layer edge 122 and the cover plate edge 143 are well-aligned for favorable assembly of the touch panel 10.

The following describes the structure of the flexible printed circuit board 13. As seen in FIGS. 2, 3, 4 and 5, in some embodiments, the flexible printed circuit board 13 passes through the driving layer hole 113, the optical adhesive 15, the sensing layer hole 123 and the optical adhesive layer 16 in sequence, so as to be electrically connected to the driving layer electrical contact 1111 of the first connecting region 111 and the sensing layer electrical contact 1211 of the second connecting region 121. In detail, the flexible printed circuit board 13 comprises a main body 131 and an electrically connecting body 132. The main body 131 passes through the driving layer hole 113 and the sensing layer hole 123. Opposite two sides of the adhesive layer 17 are adhered to a middle section of the electrically connecting body 132 and the cover plate 14 separately. Therefore, the adhesive layer 17 not only fixes the flexible printed circuit board 13 for preventing the flexible printed circuit board 13 from being torn, but also stops moisture from corroding the electrical contacts from the driving layer edge 112 and the sensing layer edge 122. Furthermore, the adhesive layer 17 is able to compensate a gap between the flexible printed circuit board 13 and the decoration region 142, thereby leveling the touch panel 10. In some embodiments, the electrically connecting body 132 extends outward from one end of the main body 131, and is attached to and electrically connected to the driving layer electrical contact 1111 and the sensing layer electrical contact 1211. In some embodiments, the electrically connecting body 132 has at least one first electrical contact 1321 and at least one second electrical contact 1322. The first electrical contact 1321 electrically contacts the driving layer electrical contact 1111. The second electrical contact 1322 electrically contacts the sensing layer electrical contact 1211. Therefore, the flexible printed circuit board 13 is able to be electrically connected to the driving layer 11 and the sensing layer 12.

As seen in FIGS. 3, 4 and 5, in some embodiments, the electrically connecting body 132 is bent and extends outward from the end of the main body 131. Two sides of the electrically connecting body 132 are stacked on to be electrically connected to the driving layer electrical contact 1111. The opposite two sides of the adhesive layer 17 are adhered to the middle of the electrically connecting body 132 and the cover plate 14, respectively As seen in FIGS. 2, 4 and 5, the middle section of the electrically connecting body 132 extends upward to be fixed between the cover plate 14 and the sensing layer electrical contact 1211. Therefore, the first electrical contact 1321 and the second electrical contact 1322 electrically contact the driving layer electrical contact 1111 and the sensing layer electrical contact 1211, respectively. Moreover, the electrically connecting body 132 is firmly sandwiched between the cover plate 14 and the driving layer 11. In other words, the electrically connecting body 132 is firmly sandwiched between the adhesive layer 17 and the sensing layer 12. Furthermore, the adhesive layer 17 has a notch 171 corresponding to a curved part 1311 of the main body 131 for preventing a protrusion formed by the bending of curved part 1311 from interfering with the adhesive layer 17. In addition, since the first connecting region 111 and the second connecting region 121 are located inside the driving layer edge 112 and the sensing layer edge 122, the touch panel 10 is more air-tight and water-proof for preventing functional failure due to moisture and salt spray corroding the electric components.

The touch panel 10 provided in the disclosure passes a heat test (keeping an ambient environment at 60 Celsius degrees over 360 hours), cold test (keeping the ambient environment at −30 Celsius degrees over 360 hours), high-temperature humidity test (keeping the ambient environment at 60 Celsius degrees with 90% relative humidity over 360 hours), cyclic temperature test (including keeping the ambient environment at 60 Celsius degrees over 30 minutes, then quenching to −30 Celsius degrees and keeping it over 30 minutes repeated 200 times), thermal shock test (steps include initially keeping the ambient environment at 25 Celsius degrees with 50% relative humidity, then heating to 60 Celsius degrees with 90% relative humidity over 15 minutes and maintaining said conditions for 10 minutes, followed by quenching to −20 Celsius degrees over 80 minutes and maintaining said conditions for 10 minutes, and finally heating to 25 Celsius degrees with 50% relative humidity, with the process repeating 200 times), an electrostatic test and a reliability test. Experimental results show clear improvement in the reliability of the touch panel 10.

In other approaches, when the first connecting region and the second connecting region are located at the driving layer edge and the sensing layer edge, the cover plate edge may not completely correspond to the driving layer edge, and the sensing layer edge, which makes a surface of the touch panel non-level. In some embodiments, since the first connecting region 111 and the second connecting region 121 are surrounded by the driving layer edge 112 and the sensing layer edge 122, respectively, both the driving layer edge 112 and the sensing layer edge 122 match the cover plate edge 143, thereby preventing the surface of the touch panel 10 from being non-level due to the aforementioned reason.

Figure 6:
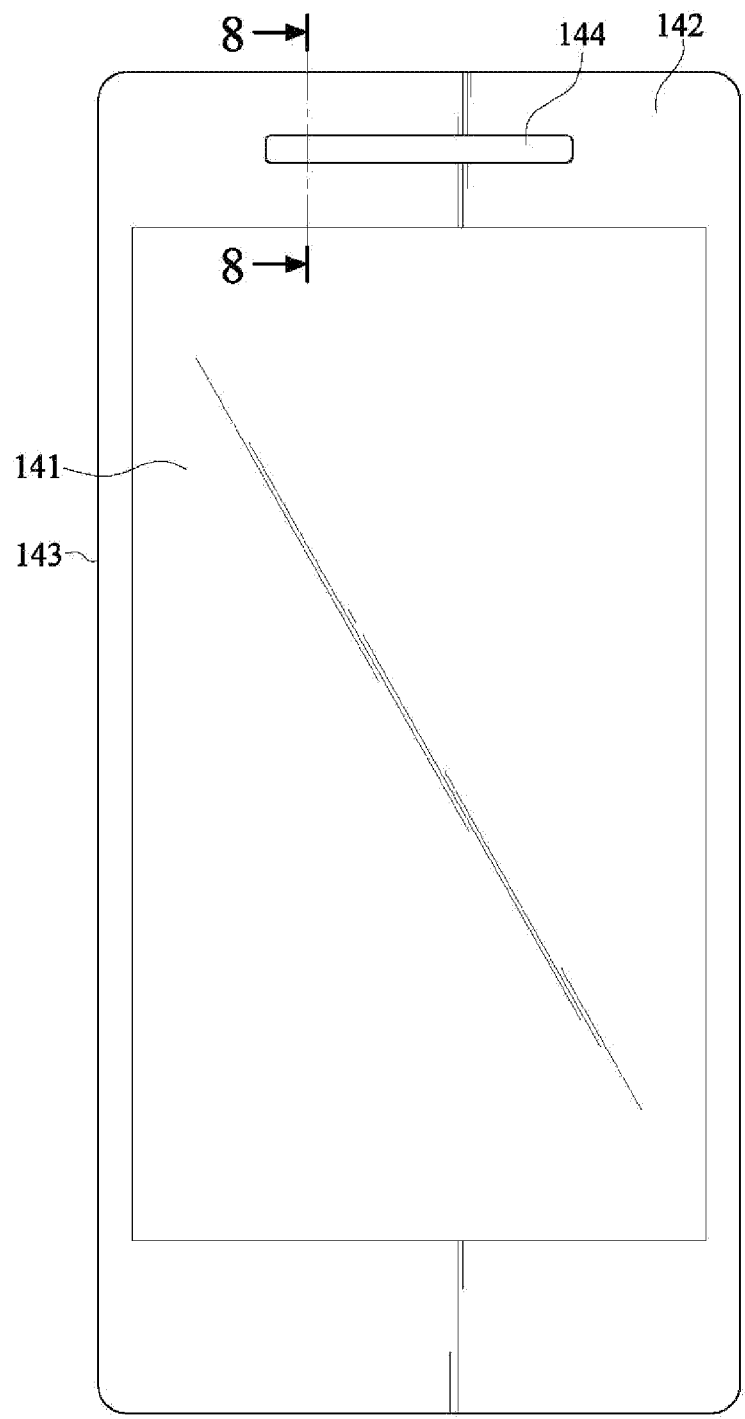
FIG. 6 is a front view of a touch panel according to an embodiment of the disclosure.
Figure 7:
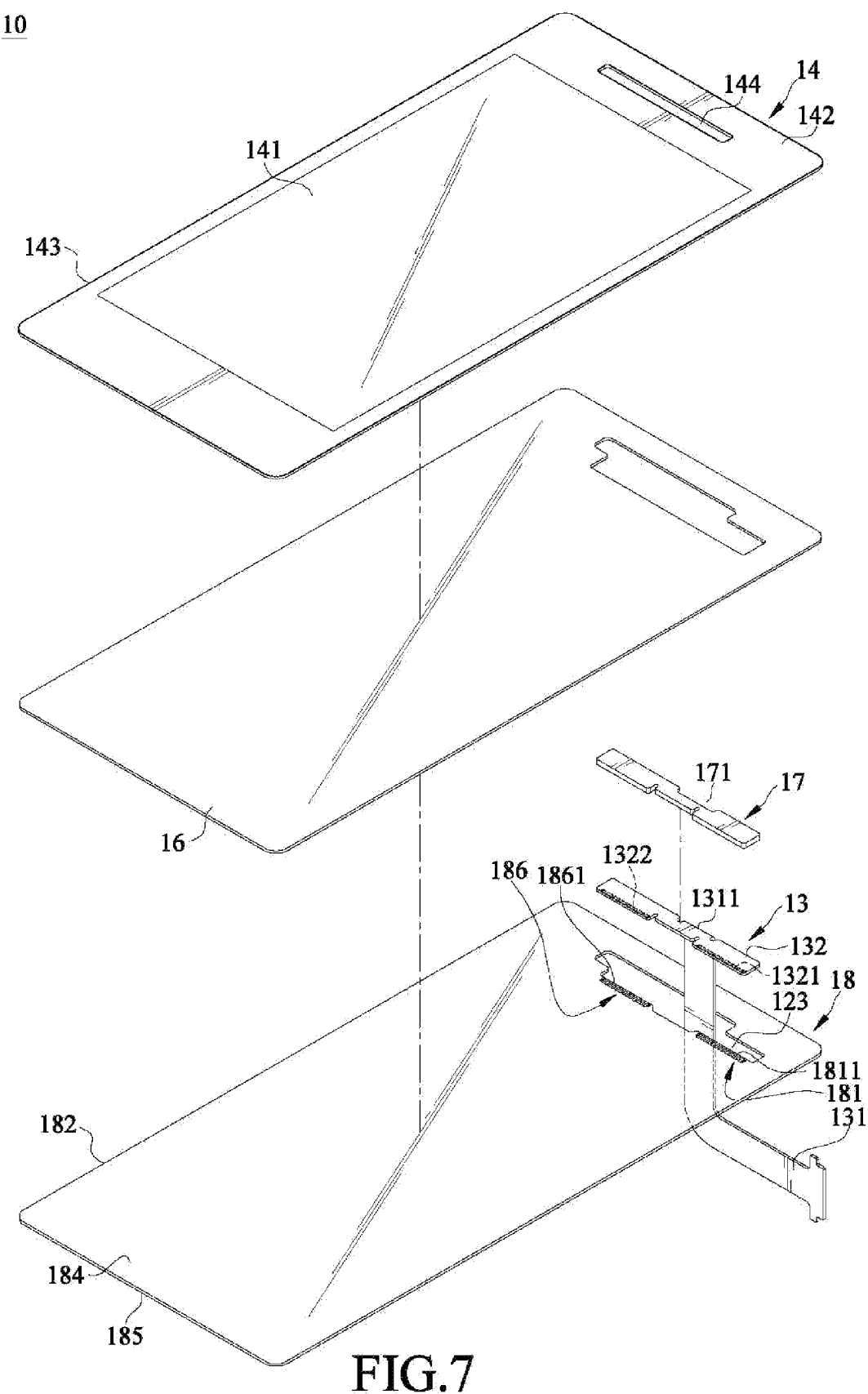
FIG. 7 is an exploded view of the touch panel in FIG. 6.
Figure 8:
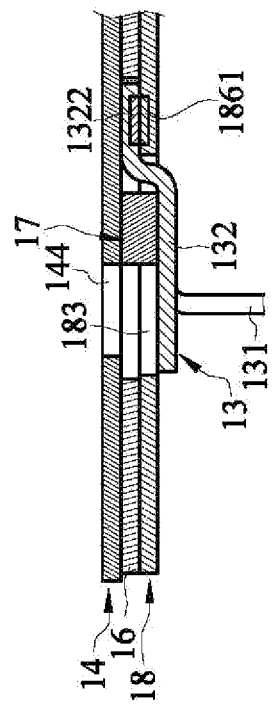
FIG. 8 is a cross-sectional view of the touch panel along a line 8-8 in FIG. 6.

In the above description, touch panels have a double-film structure (the driving layer 11 and the sensing layer 12). Touch panels having a single thin-film layer are now described herein. FIG. 6 is a front view of a touch panel according to various embodiments of the disclosure. FIG. 7 is an exploded view of the touch panel in FIG. 6. FIG. 8 is a cross-sectional view of the touch panel along a line 8-8 in FIG. 6. In some embodiments, a touch panel 10 comprises a touching layer 18. The touching layer 18 is a thin film structure.

The touching layer 18 has a top surface 184 and a bottom surface 185 opposite to each other. A touching layer edge 182 of the touching layer 18 is between the top surface 184 and the bottom surface 185 so that opposite two sides of the touching layer edge 182 are connected to the top surface 184 and the bottom surface 185, respectively. The top surface 184 has a first connecting region 181 and a second connecting region 186. The touching layer edge 182 surrounds the first connecting region 181 and the second connecting region 186. There is a third distance between the first connecting region 181 and the touching layer edge 182, and a forth distance between the second connecting region 186 and the touching layer edge 182. The distances thereof are in a range from about 0.2 mm to about 1 mm, but the disclosure is not limited thereto. The touching layer 18 further comprises a pattern layer (not shown in the drawings). In some embodiments, the pattern layer is located on the top surface 184. That is, the touch panel 10 comprises merely one pattern layer. The first connecting region 181 and the second connecting region 186 electrically connect two certain areas of the pattern layer, such as the X-axis electrode and the Y-axis electrode, respectively. The pattern layer is able to be made of materials which are the same as those of the driving layer 11 and the sensing layer 12 in the above embodiment, so that the repeated description is not described again. The touching layer 18 has a touching layer hole 183 adjacent to the first connecting region 181 and the second connecting region 186. The touching layer edge 182 surrounds the touching layer hole 183.

In some embodiments, the disclosure is not limited to the dispositions and number of pattern layers, the first connecting regions 181 and the second connecting region 186 described above. In other embodiments, both the number of the first connecting regions 181 and that of the second connecting regions 186 can be more than one. In some embodiments, the pattern layer of the touch panel 10 located on the top surface 184 is a single layer but the disclosure is not limited thereto. In some embodiments, the pattern layer located on the top surface 184 is double-layer, or two pattern layers are provided to be located on the top surface 184 and the bottom surface 185, respectively.

The touch panel 10 further comprises a flexible printed circuit board 13, a cover plate 14, an optical adhesive layer 16 and an adhesive layer 17. The cover plate 14 is disposed on the touching layer 18 by the optical adhesive layer 16. The shape of the optical adhesive layer 16 corresponds to that of the cover plate 14. The flexible printed circuit board 13 comprises a main body 131 and an electrically connecting body 132. The electrically connecting body 132 extends outward from one end of the main body 131, and is attached to and electrically connected to a touching layer electrical contact 1811 of the first connecting region 181 and a touching layer electrical contact 1861 of the second connecting region 186. In some embodiments, the electrically connecting body 132 has at least one first electrical contact 1321 and at least one second electrical contact 1322. The first electrical contact 1321 electrically contacts the touching layer electrical contact 1811. The second electrical contact 1322 electrically contacts the touching layer electrical contact 1861. Therefore, the flexible printed circuit board 13 is able to electrically connect to the touching layer 18. Opposite two sides of the adhesive layer 17 are adhered to a middle section of the electrically connecting body 132 and the cover plate 14 separately. Therefore, the adhesive layer 17 not only fixes the flexible printed circuit board 13 for preventing the flexible printed circuit board 13 from being torn, but also prevents moisture from corroding the electrical contacts from the touching layer edge 182. Furthermore, the adhesive layer 17 is able to compensate a gap between the flexible printed circuit board 13 and a decoration region 142, thereby improving the flatness of the touch panel 10. In addition, since the first connecting region 181 and the second connecting region 186 are located inside the touching layer edge 182, the touch panel 10 is more air-tight and water-proof for avoiding functional fault due to moisture and salt spray corroding the electric components.

In other approaches, when the first connecting region and the second connecting region are located at the touching layer edge, the cover plate edge may not completely correspond to the touching layer edge, which makes a surface of the touch panel non-level. In the embodiments of the present disclosure, since the first connecting region 181 and the second connecting region 186 are surrounded by the touching layer edge 182, the touching layer edge 182 matches the cover plate edge 143, thereby preventing the surface of the touch panel 10 from being non-level due to the aforementioned reason.

Figure 9:
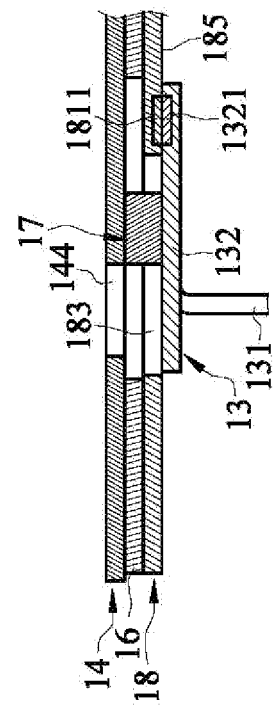
FIG. 9 is a cross-sectional view of a touch panel according to an embodiment of the disclosure.

The following describes a touch panel having a pattern layer located on a bottom surface of a touching layer, wherein the pattern layer can be single layer or double-layer. FIG. 9 is a cross-sectional view of a touch panel according to at least one embodiment of the disclosure. The disclosure of FIG. 9 is similar in many respects to that of FIG. 6, and differences are illustrated herein. A bottom surface 185 of a touching layer 18 has a pattern layer (not shown in the drawings), and has a first connecting region. The first connecting region has a touching layer electrical contact 1811. The pattern layer is electrically connected to the touching layer electrical contact 1811. An electrically connecting body 132 has a first electrical contact 1321 connected to the touching layer electrical contact 1811. Therefore, the touch panel 10 is more air-tight and water-proof for preventing moisture and salt spray from corroding the electric components.

Figure 10:
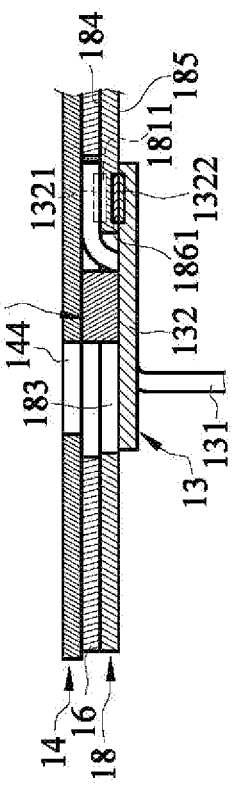
FIG. 10 is a cross-sectional view of a touch panel according to an embodiment of the disclosure.

The following describes a touch panel having at least two pattern layers located on a bottom surface and a top surface of a touching layer, respectively. FIG. 10 is a cross-sectional view of a touch panel according to at least one embodiment of the disclosure. The disclosure in FIG. 10 is similar in many respects to the embodiments described above, with differences illustrated herein. A top surface 184 of a touching layer 18 has a pattern layer (not shown in the drawings) and has a first connecting region. The first connecting region has a touching layer electrical contact 1811. The pattern layer is electrically connected to the touching layer electrical contact 1811. A bottom surface 185 of the touching layer 18 comprises another pattern layer and has a second connecting region. The second connecting region has a touching layer electrical contact 1861. The pattern layer of the touching layer 18 is electrically connected to the touching layer electrical contact 1861 located at the bottom surface 185. That is, the touch panel 10 comprises two pattern layers. An electrically connecting body 132 has at least one first electrical contact 1321 and at least one second electrical contact 1322. The first electrical contact 1321 is electrically connected to the touching layer electrical contact 1811 located at the top surface 184, and the second electrical contact 1322 is electrically connected to the touching layer electrical contact 1861 located at the bottom surface 185. Therefore, both the better air-proof property and the better liquid-proof property are provided.

To sum up, in one of the embodiments, a driving layer edge of a driving layer and a sensing layer edge of a sensing layer surround a first connecting region and a second connecting region, respectively. That is, there is a first distance between the driving layer edge and the first connecting region, and there is a second distance between the sensing layer edge and the second connecting region. In some other embodiments, a touching layer edge of a touching layer surrounds a first connecting region, and there is a third distance between the touching layer edge and the first connecting region. Therefore, a touch panel provided in this disclosure successfully solves that the touch panel is easily corroded by salt spray and moisture because a flexible printed circuit board electrically connects the edge of the thin-film layer directly.

Furthermore, opposite two sides of the adhesive layer are adhered to a middle section of an electrically connecting body of the flexible printed circuit board and a cover plate, so that the adhesive layer not only fixes the flexible printed circuit board for preventing the flexible printed circuit board from being torn, but also avoids moisture corroding the electrical contacts. Moreover, the adhesive layer is able to compensate the gap between the flexible printed circuit board and the cover plate, thereby improving the flatness of the touch panel.

What is claimed is:

1. A touch panel, comprising:
a driving layer having a first top surface and a driving layer edge, wherein the first top surface has at least one first connecting region, the driving layer edge surrounds the first connecting region, and there is a first distance between the driving layer edge and the first connecting region, wherein the driving layer has a driving layer hole being adjacent to the first connecting region; and
a sensing layer disposed on the first top surface of the driving layer, wherein a second top surface of the sensing layer away from the driving layer has at least one second connecting region, a sensing layer edge of the sensing layer surrounds the second connecting region, and there is a second distance between the sensing layer edge and the second connecting region, wherein the sensing layer has a sensing layer hole being adjacent to the second connecting region, the sensing layer hole at least partially overlaps the driving layer hole, and the first connecting region is exposed by the sensing layer hole.

2. The touch panel according to claim 1, wherein the number of first connecting regions is two, the number of second connecting regions is one, and the second connecting region does not overlap the two first connecting regions.

3. The touch panel according to claim 2, wherein the second connecting region is disposed between the two first connecting regions.

4. The touch panel according to claim 1, further comprising a flexible printed circuit board, wherein the flexible printed circuit board comprises a main body and an electrically connecting body extending outward from one end of the main body, the main body passes through the driving layer hole and the sensing layer hole, and the electrically connecting body is attached to and electrically connected to the first connecting region and the second connecting region, respectively.

5. The touch panel according to claim 4, wherein the first connecting region has a driving layer electrical contact, the second connecting region has a sensing layer electrical contact, the electrically connecting body has at least one first electrical contact and at least one second electrical contact, the at least one first electrical contact electrically contacts the driving layer electrical contact, and the at least one second electrical contact electrically contacts the sensing layer electrical contact.

6. The touch panel according to claim 1, further comprising a cover plate disposed on the sensing layer, wherein the cover plate has a cover hole, and at least part of the cover hole overlaps the driving layer hole and the sensing layer hole.

7. The touch panel according to claim 6, further comprising:
a flexible printed circuit board, wherein the flexible printed circuit board comprises a main body and an electrically connecting body extending outward from one end of the main body, the main body passes through the driving layer hole and the sensing layer hole, and the electrically connecting body is attached to and electrically connected to the first connecting region and the second connecting region, respectively; and
an adhesive layer, wherein the adhesive layer has two opposite ends, one end of the adhesive layer is adhered to the electrically connecting body of the flexible printed circuit board and the other end of the adhesive layer is adhered to the cover plate.

8. The touch panel according to claim 7, wherein the main body of the flexible printed circuit board has a curved part, an edge of the adhesive layer has a notch corresponding to the curved part.

9. The touch panel according to claim 6, further comprising two optical adhesive layers, wherein one of the optical adhesive layers is disposed between the cover plate and the sensing layer, and the other optical adhesive layer is disposed between the sensing layer and the driving layer.

10. The touch panel according to claim 6, wherein the cover plate comprises a light transmissive region and a decoration region, the decoration region surrounds the light transmissive region, and the first connecting region and the second connecting region are beneath the decoration region.

11. A touch panel, comprising:
a driving layer having a driving layer edge, a first connecting region, and a driving layer hole, wherein the driving layer edge surrounds the first connecting region, there is a first distance between the driving layer edge and the first connecting region, and the driving layer hole is adjacent to the first connecting region; and
a sensing layer disposed over the driving layer, wherein the sensing layer has at least one second connecting region, a sensing layer edge of the sensing layer surrounds the second connecting region, and there is a second distance between the sensing layer edge and the second connecting region, wherein the sensing layer has a sensing layer hole being adjacent to the second connecting region; and
a flexible printed circuit board, wherein the flexible printed circuit board comprises a main body and an electrically connecting body extending outward from one end of the main body, the main body passes through the driving layer hole and the sensing layer hole, and the electrically connecting body is attached to and electrically connected to the first connecting region and the second connecting region, respectively.

12. The touch panel according to claim 11, wherein the sensing layer hole at least partially overlaps the driving layer hole, and the first connecting region is exposed by the sensing layer hole.

13. The touch panel according to claim 11, wherein the number of first connecting regions is two, the number of second connecting regions is one, and the second connecting region does not overlap the two first connecting regions.

14. The touch panel according to claim 13, wherein the second connecting region is disposed between the two first connecting regions.

15. The touch panel according to claim 11, wherein the first connecting region has a driving layer electrical contact, the second connecting region has a sensing layer electrical contact, the electrically connecting body has at least one first electrical contact and at least one second electrical contact, the at least one first electrical contact electrically contacts the driving layer electrical contact, and the at least one second electrical contact electrically contacts the sensing layer electrical contact.

16. The touch panel according to claim 11, further comprising a cover plate disposed on the sensing layer, wherein the cover plate has a cover hole, and at least part of the cover hole overlaps the driving layer hole and the sensing layer hole.

17. The touch panel according to claim 11, further comprising an adhesive layer, wherein the adhesive layer has two opposite ends, one end of the adhesive layer is adhered to the electrically connecting body of the flexible printed circuit board and the other end of the adhesive layer is adhered to the cover plate.

18. The touch panel according to claim 17, wherein the main body of the flexible printed circuit board has a curved part, an edge of the adhesive layer has a notch corresponding to the curved part.

19. The touch panel according to claim 16, further comprising two optical adhesive layers, wherein one of the optical adhesive layers is disposed between the cover plate and the sensing layer, and the other optical adhesive layer is disposed between the sensing layer and the driving layer.

20. The touch panel according to claim 16, wherein the cover plate comprises a light transmissive region and a decoration region, the decoration region surrounds the light transmissive region, and the first connecting region and the second connecting region are beneath the decoration region.

* * * * *